United States Patent
Johnson et al.

(10) Patent No.: US 10,309,363 B2
(45) Date of Patent: Jun. 4, 2019

(54) INTEGRATED AUTOMATED IDLE REDUCTION SYSTEM AND METHOD

(71) Applicant: ECOmplete, LLC, Chandler, AZ (US)

(72) Inventors: Debra Johnson, Chandler, AZ (US); Russ Webster, Wilcox, AZ (US)

(73) Assignee: ECOMPLETE, LLC, Chandler, AZ (US)

( * ) Notice: Subject to any disclaimer, the term of this patent is extended or adjusted under 35 U.S.C. 154(b) by 152 days.

(21) Appl. No.: 14/562,258

(22) Filed: Dec. 5, 2014

(65) Prior Publication Data
US 2015/0183435 A1 Jul. 2, 2015

Related U.S. Application Data

(60) Provisional application No. 61/912,419, filed on Dec. 5, 2013.

(51) Int. Cl.
| | |
|---|---|
| B60K 11/02 | (2006.01) |
| F02N 19/10 | (2010.01) |
| F02N 11/08 | (2006.01) |
| F02D 17/04 | (2006.01) |
| B60H 1/00 | (2006.01) |
| F25B 1/00 | (2006.01) |
| E02F 9/20 | (2006.01) |

(52) U.S. Cl.
CPC ............ *F02N 19/10* (2013.01); *F02D 17/04* (2013.01); *F02N 11/0803* (2013.01); *B60H 1/00378* (2013.01); *E02F 9/2066* (2013.01); *F02N 11/0814* (2013.01); *F25B 1/00* (2013.01)

(58) Field of Classification Search
CPC ........... F02N 11/0803; F02N 2200/023; F02N 19/10; F02D 17/04; B60H 1/00378; F25B 1/00
USPC ........................................................ 701/112
See application file for complete search history.

(56) References Cited

U.S. PATENT DOCUMENTS

| | | | | |
|---|---|---|---|---|
| 4,918,937 | A | * | 4/1990 | Fineblum .................. F25B 1/00 62/175 |
| 4,947,657 | A | * | 8/1990 | Kalmbach ............ B60H 1/3204 62/236 |
| 6,273,034 | B1 | | 8/2001 | Hawkins et al. |
| 6,328,000 | B1 | | 12/2001 | Hawkins et al. |

(Continued)

*Primary Examiner* — Hai H Huynh
*Assistant Examiner* — Gonzalo Laguarda
(74) *Attorney, Agent, or Firm* — Jennings, Strouss & Salmon, PLC; Michael K. Kelly; Daniel R. Pote

(57) ABSTRACT

An integrated automated idle reduction system is disclosed. The system may include an APU and various controllers providing automation. The system may enable automating features, such as automatically controlling various power sources, engine start, engine stop, the APU, and accessory systems. The APU may be an engine, battery and/or other power source that is selectably connectable to vehicle systems to provide electrical power while the OEM engine of the vehicle is not running. The APU may also provide electrical power while the OEM engine is not running. Additionally, the APU may drive an air conditioning compressor while the OEM engine is not running, such as to keep the cab of a vehicle cool. Prior cold starting the OEM engine, the APU may warm engine coolant, and the integrated automated idle reduction system may circulate the warmed coolant through the OEM engine in preparation for starting.

13 Claims, 12 Drawing Sheets

(56) References Cited

U.S. PATENT DOCUMENTS

| | | | |
|---|---|---|---|
| 6,339,741 B1 | 1/2002 | Ritter et al. | |
| 6,371,081 B1 | 4/2002 | Hawkins et al. | |
| 6,453,853 B1 | 9/2002 | Hawkins et al. | |
| 6,640,469 B1 | 11/2003 | McKenzie et al. | |
| 6,814,053 B2 | 11/2004 | Hawkins et al. | |
| 6,925,375 B2 | 8/2005 | Ritter et al. | |
| 6,993,426 B2 | 1/2006 | Hawkins | |
| 7,036,477 B1* | 5/2006 | Thompson | F02D 17/04 123/179.4 |
| 7,091,629 B2 | 8/2006 | Hawkins | |
| 7,104,924 B2 | 9/2006 | Hawkins et al. | |
| 7,280,907 B2 | 10/2007 | Hawkins et al. | |
| 7,286,917 B2 | 10/2007 | Hawkins et al. | |
| 7,481,187 B2* | 1/2009 | Biess | F01M 5/021 123/179.19 |
| 7,873,452 B2 | 1/2011 | Hawkins et al. | |
| 8,649,961 B2 | 2/2014 | Hawkins et al. | |
| 2004/0084014 A1 | 5/2004 | Hawkins et al. | |
| 2004/0262995 A1* | 12/2004 | Hawkins | F02N 11/0803 307/10.6 |
| 2010/0318283 A1* | 12/2010 | Renner | B60P 3/14 701/112 |
| 2011/0246013 A1* | 10/2011 | Yee | B60L 11/1859 701/22 |
| 2016/0230183 A1 | 8/2016 | Abad et al. | |

\* cited by examiner

INTEGRATED AUTOMATED IDLE REDUCTION SYSTEM AND METHOD

CROSS-REFERENCE TO RELATED APPLICATIONS

This application claims priority to and the benefit of U.S. Provisional Patent Application Ser. No. 61/912,419 filed Dec. 5, 2013, and entitled "Integrated Idle Reduction System and Method for Equipment and Vehicles." The aforementioned application is incorporated by reference in its entirety for all purposes.

FIELD

The present disclosure generally relates to an integrated and automated idle reduction system. More specifically, the present disclosure relates to an integrated automated idle reduction system for heavy-duty off-road equipment or vehicles.

BACKGROUND

There is an absence of heavy-duty off-road equipment applications for automated, integrated and synchronized idle reduction that address and solve the underlying causes of excessive engine idle time. Internal combustion engines in heavy equipment (e.g. mining, construction equipment and vehicles, such as haul trucks, earthmovers, loaders or the like) typically idle anywhere between 15-30%, but can under certain circumstances idle as much as 80% of the time.

Idling behaviors, habits, and practices are characteristically engrained as a result of operator traditions and historical practices, outdated perceptions of mechanical limitations, operator comfort and convenience, and safety issues. Heavy equipment operators have generally been taught through tradition by experienced operators and equipment suppliers that the equipment should never be turned off during operations so as not to damage components such as starters, or impede rapid equipment startup for immediate operations or for continued, efficient production. Because these beliefs run deep, and are generally based on both real and exaggerated concerns, operators can be unmindful/heedless of the excessive amount of time they are allowing their equipment to idle, the tremendous amounts of fuel that are wasted during those idling times, and the costly negative impact this idling has on component and engine lives. Subsequently, heavy equipment operations often treat idle as an inevitable byproduct of production and are usually inattentive to the excessive and unnecessary cost and environmental impact associated with engine idling.

Idling also reduces the life of the engine by adding unproductive operating hours to the engines, as well as causing more wear on engine components and leaving behind excessive soot and grime from unburned fuel. Idle operations are also harder on an engine than when it is running at load. Extra avoidable preventative maintenance is required as the incremental and unproductive idle hours are accrued, resulting in greater cost, labor and reduced productivity. In addition, while heavy equipment is idling, burning of excess fuel increases air pollution through engine exhaust emissions that affect both the environment as well as the workers in the area of the excessive idling activities.

In addition to tradition and culture as causes of unnecessary idling, the equipment operating environment contributes to the underlying causes. Systems currently exist to automate shutting engines down, but that is typically all they do. Similarly, there are systems that can act on the cab climate or engine temperature, or provide power to auxiliary equipment. These are typically stand-alone systems that are turned on manually by the operator. In addition to the cultural impediments to relying on these stand-alone solutions, another challenge is that off-road equipment operators work in diverse settings and locations. Weather conditions, ambient temperatures, inefficiencies and limitations in work operations and production schedules (e.g. shift changes, equipment down time due to repairs) all affect idle time. For example, a driver operating a haul truck in the pit of a remotely located mine where the ambient temperature could be well below zero needs warmth in his cab both for his comfort and to operate the equipment safely.

It is generally assumed to be difficult to reduce idle in these situations as the drivers/operators need comfort, radios and lights must be functioning for safety, and the equipment must be immediately operational, even though they are idling while waiting, for example, in a queue to be loaded; for poor or inclement weather conditions to change; for a repair to be completed to continue the operation; or other reasons. The idling situations that have been addressed to date in on-road applications have not had the same safety or operational constraints faced by the off-road equipment, and have therefore not required integrated automation. Furthermore, anti-idle laws have provided the motivation for on-road truck/bus companies to require their drivers to turn off engines rather than idle them, whereas no such laws govern off-road mining operations.

Off-road equipment and on-road vehicles powered by internal combustion engines are significant contributors to air pollution and account for, by some estimates, more than 25% of the total energy and 70% of the total petroleum consumed in the United States. Further, fuel consumption and the pollution resulting therefrom impose a variety of health, economic, and environmental burdens on society. For example, exhaust byproducts of internal combustion engines make the air more difficult to breathe and are generally thought to harm the natural environment. Moreover, liberal and/or wasteful use of the Nation's and World's petroleum reserves depletes these reserves at an unwise and potentially unnecessary rate.

SUMMARY

The forgoing features and elements may be combined in various combinations without exclusivity, unless expressly indicated herein otherwise. These features and elements as well as the operation of the disclosed embodiments will become more apparent in light of the following description and accompanying drawings.

The methods and systems disclosed herein involve creating an integrated electrical system that will automate the process of turning off an engine when certain idling and operational criteria have been met, then triggering power to and operation of various components using relays, circuit boards, switches, or other electrical, mechanical or computerized control measures. Automating and providing alternative power source(s) for the operation of onboard components such as climate control, lighting, radios and the like, while turning off other unnecessary components such as the engine, air compressor, lights and so forth, will reduce the unnecessary equipment idling.

The methods and systems also can involve, in addition to automatic start and stop capabilities, the ability to engage a remote start up (cold start) procedure. This procedure engages the auxiliary heat system cycle to bring the engine coolant and block up to an appropriate temperature to make the engine easier to start which helps reduce extreme wear on the engine when the components are cold. The auxiliary system can also be utilized to supplement normal operation of the equipment in the event of certain primary equipment failure such as air conditioner compressors or a dead battery.

An integrated and automated idle reduction system for automatically controlling equipment powered by an internal combustion engine and that automates a series of activities is disclosed. The system includes an electrical circuit system that in response to a predefined set of operating criteria being met relays instructions to an electrical component and at least one of a switch, a relay, a timer, and a valve. The system includes an engine shutoff switch connectable to the internal combustion engine and controllable in response to the electrical circuit system. The system also includes an auxiliary power unit (APU) connected to the electrical circuit system and providing electrical power, the APU including at least one of a diesel engine, a gasoline engine, a battery, a solar panel, and a capacitor or other power source. The at least one electrical component may include at least one of directing the engine shutoff switch, providing electrical power from the APU to an electrical device, switching operation of the electrical device, and automatically enabling an operator to control the electrical device. The system further may include indicators for notifying the operator of the automated series of activities, the indicators including at least one of lights, audible alerts, and signals. The electrical circuit system may be connected to a shutdown controller and an auto start controller and each of the electrical circuit system, the engine shutoff switch, the APU, the at least one electrical component, and the indicators may be controlled by the electrical circuit system in response to at least one of the shutdown controller and the auto start controller.

An integrated and automated method for idle reduction of heavy-duty off-road equipment by delivering signals to components on equipment in an automated fashion in response to predefined idling criteria is also disclosed. The method may include sensing the equipment operating conditions, determining that the equipment operating conditions correspond to a set of the predefined idling criteria, and sending an electronic signal to an engine shutoff switch, an APU, and an electrical component in the equipment in response to the determining. The electronic signal may include an instruction to at least one of: idle an engine, shut down the engine, and start the engine. The electronic signal may further trigger operation of at least one of the engine, the electrical component, and the APU. The electrical component may include at least one of a relay, a fuse, a sensor and a switch.

A method of automatically shutting down an engine is provided. The method may include determining by at least one of a shutdown controller and an auto start controller of an idle alternative system (IAS) control circuit that user/situational criteria are present in response to assessing a stop engine key state, starting, by the shutdown controller of the IAS control circuit, a shutdown timer in response to the user/situational criteria being present, and delivering, by the shutdown controller of the IAS control circuit, a warning in response to the shutdown timer indicating the passage of a first short time period. The method may also include shutting down, by the shutdown controller of the IAS control circuit, the engine in response to the shutdown timer indicating the passage of a first long time period.

An automated method of warming an OEM engine prior to starting the OEM engine is additionally provided. The method may include ascertaining, by a coolant temperature sensor in logical communication with an auto start controller, that a coolant temperature is less than a threshold temperature in response to user/situational criteria being present. The method may further include setting, by the auto start controller, a coolant heater on in response to the coolant temperature being less than the threshold temperature, and setting, by the auto start controller, the coolant heater off in response to a heater timer elapsing. The coolant heater may include an APU in communication with an auxiliary coolant interconnect system configured to selectively communicate coolant between the APU and the OEM engine. The coolant heater may further include an OEM heater core and/or other elements of an OEM engine system.

Further disclosed is an integrated automated idle reduction system. The system may include an IAS control circuit including an APU control circuit whereby an APU is started, and a shutdown controller whereby the OEM engine is stopped in response to an Idle Shutdown Mode.

Moreover, a further integrated automated idle reduction system is disclosed. The system may include an auxiliary air conditioning system driven by an APU, and an auxiliary air conditioning system interconnect system configured to selectively connect the auxiliary air conditioning system to an evaporator in response to a user/situational criteria being present. These and other features and advantages of the system will be more fully understood from the following description of certain specific embodiments of the system, taken together with the accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

The drawings are solely for purpose of illustration and do not define the limits of the systems and methods. Furthermore, the components in the figures are not necessarily to scale. In the figures, like reference numerals designate corresponding parts throughout the different views.

DETAILED DESCRIPTION

Figure 1:
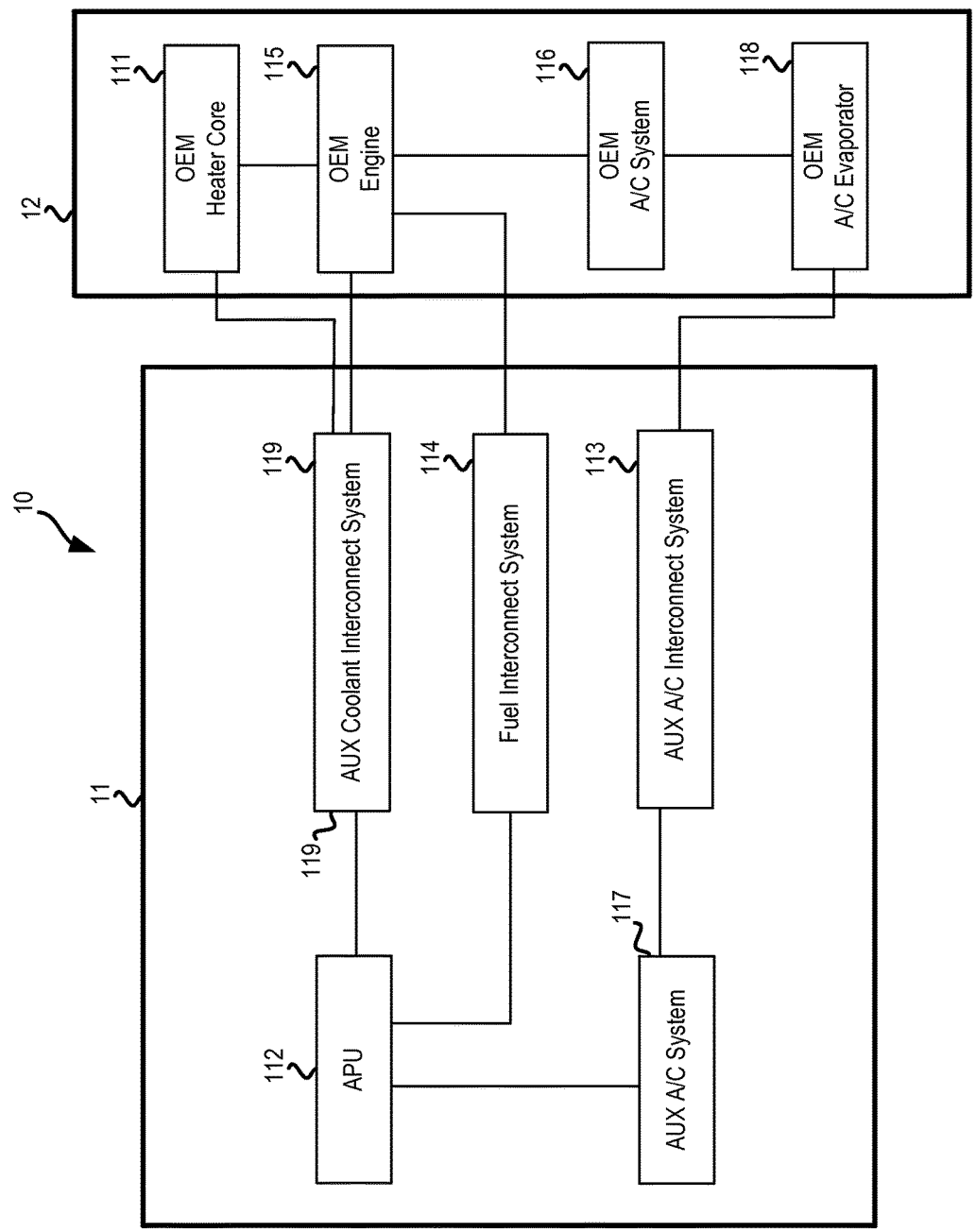
FIG. 1 illustrates a schematic view of an exemplary system for an automated idle reduction system according to various embodiments.

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

The word "exemplary" is used throughout this disclosure to mean "serving as an example, instance, or illustration." Any embodiment or feature described herein as "exemplary" is not necessarily to be construed as preferred or advantageous over other embodiments or features. As used herein, "logical communication" or "logical connection" may refer to any method by which information may be conveyed. Logical communication may facilitate the transmission of signals, whether analog or digital, between two or more components. Thus, "logical communication" may refer to any electrical, electromagnetic, radio frequency and/or optical method whereby information may be conveyed.

By implementing an engine idle shutdown system that automatically triggers the operation of key onboard and supplemental systems, the driver/operator can have comfort, safety, and confidence in their equipment restarting, while fuel usage and harmful engine emissions are reduced. In this scenario, the driver/operator does not have to consciously shut the engine down. At the same time, the usual resistance to traditional shutoff technologies is removed because the most significant underlying causes of engine idling have been eliminated.

Unlike over-the-road (OTR) trucks that must comply with regulatory idling mandates and other transportation and environmental directives, off-road equipment idling has generally not been addressed through regulation, manufacturer technologies, or internally by corporate management. With the integrated and automated idle reduction system disclosed herein, there will likely be no need for such regulation as the economic benefits of the system make it inherently appealing to eliminate engine idling. Equipment operators finally have a solution to address excess idling caused by the inherent inefficiencies and interruptions that occur during production.

Individual aspects of the idle problem have been addressed over time through mechanical and technological fixes, particularly for on-road situations such as sleeper cabs, where idling was done for extended periods, rather than intermittently and in the middle of an active work area as happens in a typical mine. These discrete solutions, however, have not been synchronized and integrated into a comprehensive system that controls and reduces idle in an efficient and responsive way. As daily operations begin or when a work shift changes, equipment either is put into use from a cold start or may already be in use and idling. An exemplary integrated and automated idle reduction system disclosed herein can detect such things as:
  1) when the equipment is idling;
  2) when the equipment can safely be shut down;
  3) elapsed idle time;
  4) power needs; and/or
  5) current conditions such as:
     a. cab HVAC settings,
     b. ambient temperatures,
     c. engine operating modes, and so forth.

The integrated and automated idle reduction system then uses that information to trigger alternative power sources (e.g., auxiliary power unit (APU), batteries, diesel burners, capacitors, solar, or the like) as well as auxiliary systems, switches, and other components. In addition to the auxiliary components, alternative power is then made available to existing systems such as radios, lighting, fans, and the like. When predefined conditions exist, for example but not limited to the following scenarios a signal is sent to activate a timer that does a countdown to shutting down the engine. The scenarios may include, but are not limited to:
  1) the equipment is in neutral;
  2) the parking brake is on;
  3) the engine is operating at a normal idle revolutions per minute (RPM);
  4) power take off (PTO) is or is not needed; and/or
  5) the oil pressure is at a designated level;

The integrated and automated idle reduction system can be set to allow these conditions to continue for an amount of time, which could be preset or can be determined by users according to their needs. Once that time limit is approaching, varied sensory warning lights or alarms can be programmed to alert the operator that the engine will be shutting down soon. At this juncture, optional, manual override capabilities can be employed to prevent the shutdown based on current operating conditions.

The integrated and automated idle reduction system can suitably trigger a variety of automated activities in response to an engine idling for a period of time or according to a specific set of circumstances. These activities could include, but are not limited to:
  1) Shutting off the engine based on various predetermined criteria;
  2) Providing auxiliary power (e.g., battery, diesel, capacitor, solar, or the like) to components needed during "idle shutdown mode;"
  3) Addressing the underlying causes of idle such as:
     a. Operator comfort and safety,
     b. cab heating,
     c. cooling,
     d. air quality, e. radio operation,
f. lighting, and the like,
g. Engine temperature during extremely cold ambient temperatures,
h. Auxiliary and ancillary equipment operation during shutdown,
i. Loss of compressed air pressure, and/or
j. Mitigating the risk of the equipment engine failing to restart.

To supplement the automatic shutdown of the equipment, in accordance with exemplary embodiments, the integrated and automated idle reduction system relies on a series of relays, electrical switches, sensors and or control modules to automatically engage a wide variety of components. The relays, switches, sensors, and the like can be mechanical or part of a circuit board, or employ any other means of sending a signal to an electrical or mechanical component. The integrated and automated idle reduction system can deploy pumps or independent coolant or block heaters when the automated shutdown occurs to maintain appropriate temperatures within engine components to ensure reliable equipment restarts. While operating in "idle shutoff mode," in accordance with exemplary embodiments, the integrated and automated idle reduction system can employ various continuous monitoring measures, such as testing the coolant/block temperature, or using existing cab thermostats to run climate control components. For example, when the coolant temperature falls below a predetermined setting, the integrated and automated idle reduction system engages to increase the coolant/block back up to the predetermined appropriate temperature. Once reached the system reverts back to the monitoring phase.

In accordance with various exemplary embodiment, additional components of the integrated and automated idle reduction system can include, but are not limited to:
1) Cab heater;
2) Fan and controls;
3) Coolant recirculating pump;
4) Coolant thermostat;
5) Block heater;
6) Auxiliary Power Unit (APU);
7) Shut off timer;
8) Air conditioner components such as:
   a. compressor,
   b. condenser,
   c. evaporator,
   d. motor, and/or
   e. other standard refrigeration equipment, which may or may not integrate into the existing onboard air conditioner (a/c) system
9) Air filtration systems;
10) Battery isolators;
11) Battery alarms;
12) Override and other switches;
13) Electrical relays, fuses, and/or other electrical components;
14) Circuit boards and/or software;
15) Supplemental batteries, alternators, capacitors, diesel powered burners or generators and/or other power sources;
16) Valves, such as check valves, ball valves, and the like;
17) Indicator lights and alarms; and/or
18) Restart capability;

The integrated and automated idle reduction system and method have the capability to automatically time the APU power runtime. This time period can be preset or determined by the user according to their needs. If the engine is not restarted, the APU turns off, powering off all components as in a normal shutdown, and the equipment will now be started from a cold start position. The integrated and automated idle reduction system pairs automated shutdown process for heavy equipment with automated auxiliary power and component operations.

Due to the wide variety of equipment the integrated and automated idle reduction system will be installed on, as well as the fact that it is intended to be customizable to the needs of the operations, the description herein is intended to provide one example of how the integrated and automated idle reduction system can be programmed and built. Ultimately, it can be built with electrical components ranging from standard automotive relays, e.g., 12V or 24V relays, to a fully programmed microprocessor, microcontroller, or circuit board or other electrical control module. A key functionality of the system is to ensure the automated starting and stopping of various components, systems, processes, functions and the like on board a piece of heavy equipment when the equipment has been operating in an idle condition for a defined period of time, without requiring any input from the operator.

In various embodiments, integrated and automated idle reduction system may be installed in and used with a variety of types of combustion engines, off-road equipment, including, but not limited to, diesel engines, gasoline engines, construction or mining equipment, and marine engines. The integrated and automated idle reduction system, in particular the automation, may also be used in other applications, such as on-road vehicles and equipment, such as school buses, tractor trailers and the like.

Having generally described an exemplary integrated and automated idle reduction system and method and their various embodiments, a more detailed reference to various embodiments will be illustrated and disclosed. In particular, with reference to FIG. 1, a vehicle engine system 10 may comprise an OEM engine system 12 and an exemplary Integrated Automated Idle Reduction System ("IAS") 11. An OEM engine system 12 and an IAS 11 may be variously interconnected, to achieve the functionalities discussed herein. For example, an OEM engine system 12 may comprise an OEM engine 115, having an OEM heater core 111 connected to the OEM engine 115, to heat engine coolant, such as in cold weather, and an OEM air conditioner system 116, such as receiving mechanical energy from the OEM engine 115 in order to cool a vehicle cab. The OEM air conditioner system 116 may operate as a heat pump, causing air proximate to an OEM air conditioner evaporator 118 to be cooled, thereby cooling a vehicle cab (or alternately, heating the cab, depending on the direction of heat pump operation).

An IAS 11 may be interconnected with the OEM engine system 12. The IAS 11 may comprise an APU 112. The APU 112 may be interconnected to the OEM engine 115 and the OEM heater core 111 via an auxiliary coolant interconnect system 119. Similarly, the APU 112 may be interconnected with the OEM engine 115 to receive fuel from the OEM engine 115, such as by a fuel interconnect system 114. Moreover, the APU 112 interconnects with an auxiliary air conditioner system 117, imparting mechanical energy to the auxiliary air conditioner system 117, in order to cool a vehicle cab. The auxiliary air conditioner system 117 may be connected with the OEM air conditioner evaporator 118, such as by an auxiliary air conditioner interconnect system 113. The arrangement of an auxiliary air conditioner system 117 and auxiliary air conditioner interconnect system 113 in combination with the APU 112 and the OEM air conditioner evaporator 118 may be termed "an Auxiliary Compressor Configuration" or "ACC", as used herein.

An APU 112 may comprise an internal combustion engine, such as a diesel engine. Alternatively, the APU 112 may comprise a gasoline internal combustion engine, or may comprise a turbine engine. The APU 112 may comprise a reciprocating engine, or a rotary engine, or any other engine as desired. The APU 112 may include an alternator that may be used to maintain a charge on OEM and/or supplemental batteries. In further embodiments, the APU 112 does not comprise an internal combustion engine but rather comprises a battery. In further embodiments, the APU 112 does not comprise an internal combustion engine but rather comprises a fuel cell, a storage capacitor, a battery and/or an electric motor or other power source.

IAS 11 can suitably automate the process of turning off OEM engine 12 when certain idling and operational criteria have been met, then triggering power to and operation of various components using relays, circuit boards, switches, or other electrical, mechanical or computerized control measures, such as those illustrated in FIGS. 9-12. Automating and providing alternative power source(s) for the operation of onboard components such as climate control, lighting, radios and the like, while turning off other unnecessary components such as the engine, air compressor, lights and so forth, will reduce the unnecessary equipment idling. In addition to automatic start and stop capabilities, IAS 11 can facilitate a remote start up (cold start) procedure. This procedure engages the auxiliary heat system cycle to bring the engine coolant and block up to an appropriate temperature to make the engine easier to start which helps reduce extreme wear on the engine when the components are cold. The auxiliary system can also be utilized to supplement normal operation of the equipment in the event of certain primary equipment failure such as air conditioner compressors or a dead battery.

Figure 2:
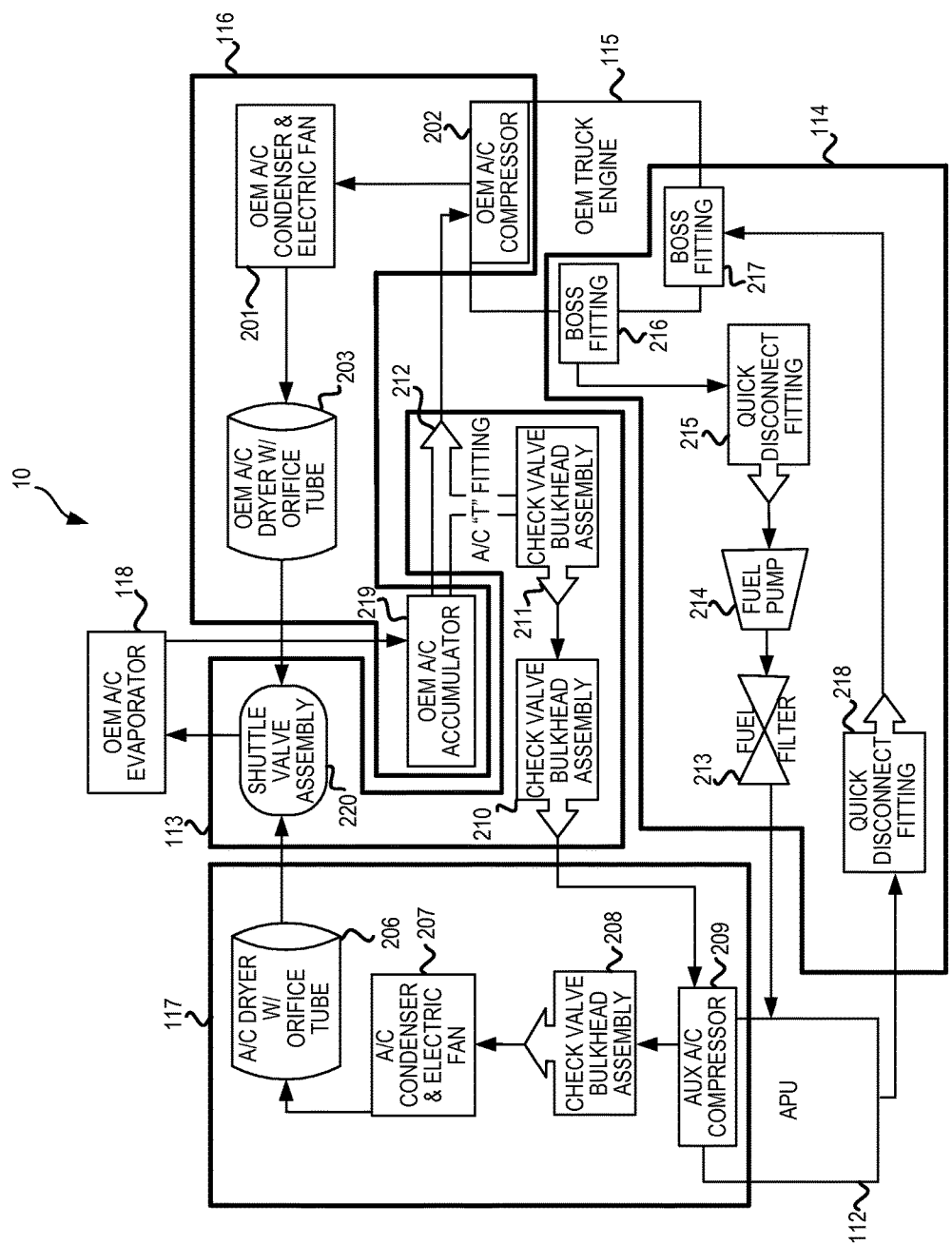
FIG. 2 illustrates a schematic view of an auxiliary air conditioner interconnect module and fuel interconnect configuration of an automated idle reduction system according to various embodiments.

With reference now to FIG. 2, the auxiliary air conditioner system 117 may comprise an auxiliary air conditioner compressor 209 connected in mechanical communication with a mechanical energy imparting output of the APU 112. For example, the auxiliary air conditioner system 117 may comprise an auxiliary air conditioner compressor 209 connected by at least one of: a pulley and belt, a shaft, and/or a clutch, to the APU 112. In this manner, the auxiliary air conditioner system 117 may be driven by the APU 112, such as to effectuate the flow of compressible gas between the auxiliary air conditioner compressor 209 & a condenser/fan unit 207 and an evaporator (for example, OEM air conditioner evaporator 118). For example, an auxiliary air conditioner compressor 209 may be fluidically connected, such as by plumbing, to a condenser/fan unit 207. A check valve bulkhead assembly 208 may be disposed between the condenser/fan unit 207 and the auxiliary air conditioner compressor 209. The check valve bulkhead assembly 208 may at least one of prevent unwanted backflow of fluid in the auxiliary air conditioner system 117 (such as when the auxiliary air conditioner system 117 is out of service and the OEM air conditioner system 116 is in service), and provide for fluidic connection through a vehicle bulkhead, such as a cab sidewall.

The auxiliary air conditioner system 117 may further include an AC dryer with orifice tube 206 in fluidic communication with the condenser/fan unit 207 and arranged to receive fluid from the condenser/fan unit 207 enroute to the OEM air conditioner evaporator 118. The air conditioner dryer with orifice tube 206 may remove humidity from the cool air circulated about the condenser/fan unit 207 (e.g., the "dryer"), and may permit the refrigerant to expand (and pressure lower) prior to entering the auxiliary air conditioner interconnect system 113 (e.g., the "orifice tube"). Subsequently, the refrigerant may exit the auxiliary air conditioner system 117 and may enter the auxiliary air conditioner interconnect system 113. In further embodiments, the auxiliary air conditioner system 117 may further, or alternatively, comprise an evaporative cooler, or any other desired air conditioner system.

The auxiliary air conditioner interconnect system 113 may comprise various components, fittings, plumbing, and valves selectively engaging the auxiliary air conditioner system 117 and the OEM air conditioner system 116 with the OEM air conditioner evaporator 118. The auxiliary air conditioner system 117 or the OEM air conditioner system 116 may conduct thermal energy from (or to, if operated in reverse) the OEM air conditioner evaporator 118. The auxiliary air conditioner interconnect system 113 may comprise a shuttle valve assembly 220 disposed in fluidic connection with the air conditioner dryer with orifice tube 206 of the auxiliary air conditioner system 117, and a corresponding OEM air conditioner dryer with orifice tube 203 of the OEM air conditioner system 116. The shuttle valve assembly 220 may be further connected in fluidic connection with the OEM air conditioner evaporator 118, and may selectively connect the OEM air conditioner evaporator 118 to either of the auxiliary air conditioner system 117 or the OEM air conditioner system 116, as desired and in response to the IAS control circuit, such as for example control circuit 900 (FIGS. 9-12) discussed further herein.

The auxiliary air conditioner interconnect system 113 may further comprise an air conditioner T-fitting 212 disposed between the OEM air conditioner accumulator 219 and each of the OEM air conditioner compressor 202 and the auxiliary air conditioner compressor 209. In this manner, return fluid from the OEM air conditioner evaporator 118 may flow to one or both of the OEM air conditioner compressor 202 and the auxiliary air conditioner compressor 209, depending on which of the OEM air conditioner compressor 202 and the auxiliary air conditioner compressor 209 is currently running. Fluid leaving the air conditioner T-fitting 212 enroute to the auxiliary air conditioner compressor 209 may pass through one or more check valve bulkhead assembly such as check valve bulkhead assembly 211 and check valve bulkhead assembly 210, whereby undesired fluid back flow is prevented, and fluidic connection is provided through a vehicle bulkhead, such as a cab sidewall.

A fuel interconnect system 114 may comprise components, switches, and valves whereby an APU 112 receives fuel from an OEM engine 115 and returns unused fuel back to the OEM engine 115. For example, a fuel interconnect system 114 may comprise a fuel output boss fitting 216 disposed in fluidic communication with a fuel outflow orifice of the OEM engine 115. In this manner, the fuel supply to the OEM engine 115 may further source fuel for the APU 112. The fuel output boss fitting 216 may conduct fuel to a quick disconnect fitting 215, wherefrom it further flows to a fuel pump 214. Fuel pump 214 may comprise a mechanically operated pump or an electrically operated pump, or any pump whereby fuel is drawn through the fuel output boss fitting 216 and directed through an inline fuel filter 213. Inline fuel filter 213 may remove detritus from the fuel and further pass the fuel to the APU 112 for combustion.

The fuel interconnect system 114 may further comprise a fuel inlet boss fitting 217 disposed in fluidic communication with a fuel inflow orifice of the OEM engine 115. This fitting may provide excess fuel (e.g., "bypass fuel") that is not used by the APU 112 a path back to the fuel tank. The APU 112 may be connected to the fuel inlet boss fitting 217 via a quick disconnect fitting 218. By incorporating various quick disconnect fittings 215 and 218, the APU 112 may be rapidly disconnected such as for servicing.

Figure 3:
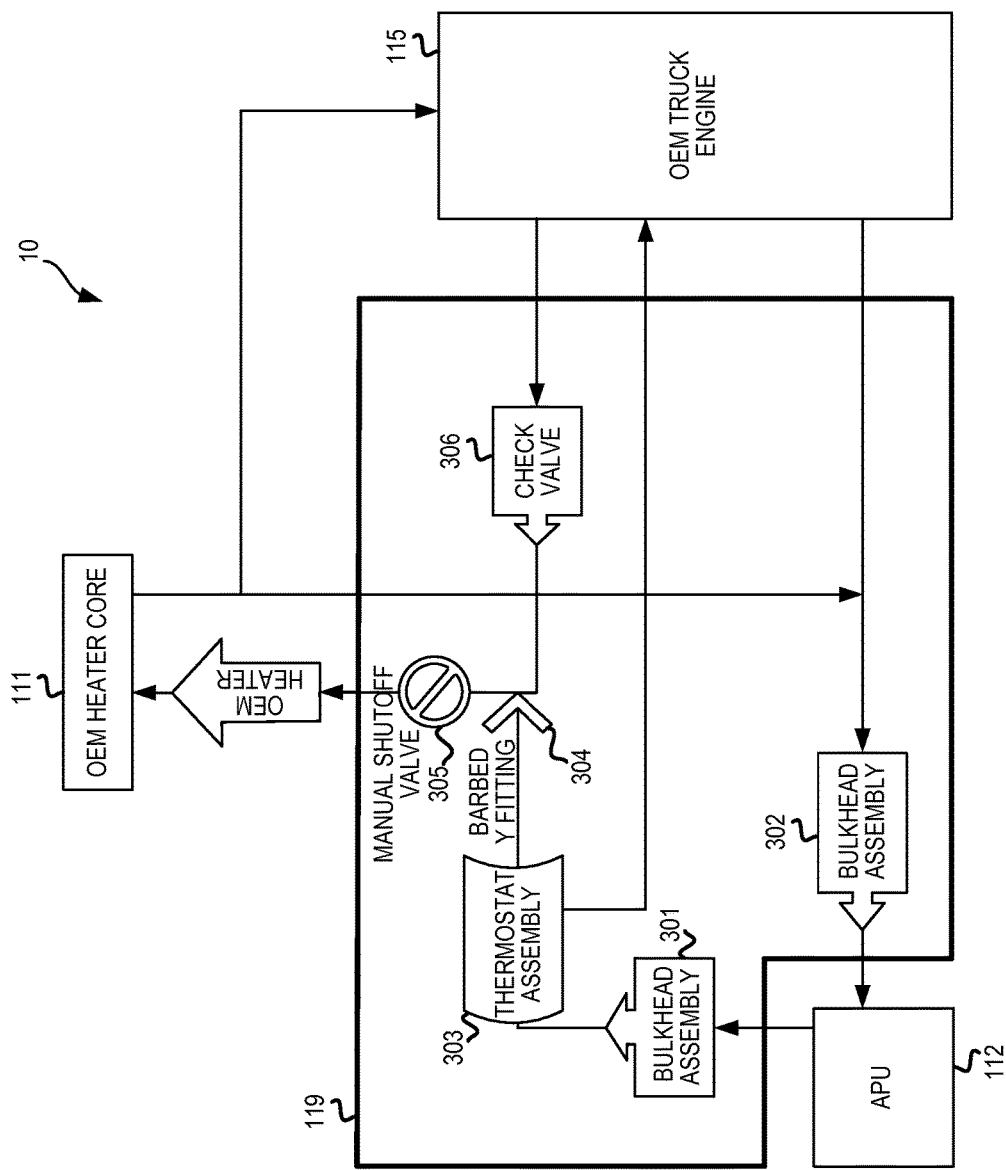
FIG. 3 illustrates a schematic view of an auxiliary coolant heater interconnect module of an automated idle reduction system according to various embodiments.

With reference now to FIG. 3 and as mentioned, the APU 112 may be interconnected to the OEM engine 115 and the OEM heater core 111 via an auxiliary coolant interconnect system 119. The auxiliary coolant interconnect system 119 may connect both the APU 112 and an OEM engine 115 to an OEM heater core 111. In this manner, either engine may circulate coolant through the OEM heater core 111. For instance, while OEM engine 115 may circulate coolant through the OEM heater core 111, in order to further heat engine coolant during cold conditions, the APU 112 may circulate coolant through the OEM heater core 111 and also through the OEM engine 115, such as to warm the OEM engine 115, prior to it being started (e.g. "cold start process").

The auxiliary coolant interconnect system 119 may comprise a thermostat assembly 303. The thermostat assembly 303 may receive circulating coolant from the APU 112 and direct it either toward the OEM heater core 111 or and direct it directly toward OEM engine 115. In various embodiments, the thermostat assembly 303 directs a portion of the circulating coolant toward both the OEM heater core 111 and the OEM engine 115. For instance, if the circulating coolant is above a temperature threshold, at least a portion of the circulating coolant may be directed toward the OEM engine 115, such as to warm the engine, whereas if it is below a temperature threshold, at least a portion of the circulating coolant may be directed toward the OEM heater core 111, such as to provide for further heating. The coolant leaving the thermostat assembly enroute to the OEM heater core may pass through a Y fitting 304 into the OEM heater core 111. As illustrated in FIG. 3, bulkhead assembly 301 may be disposed proximate to the coolant outlet of the APU 112, and bulkhead assembly 302 may be disposed proximate to the coolant inlet of the APU 112. Moreover and as illustrated, a manual shutoff valve 205 and a check valve 306 may be implemented to provide for the proper flow of fluid through the coolant system. In this manner, coolant may be circulated through the OEM heater core 111 by either, or both, of the APU 112, and the OEM truck engine 115, and as such, may be warmed even while the OEM truck engine 115 is shut off.

As briefly mentioned, an example IAS 11 may comprise a system or device such as IAS control circuit 900 for evaluating defined conditions to assess idle and trigger actions, such as engine shutdown, startup, or other component actions (See FIGS. 9-12). The various interconnect systems discussed above may be automatically controlled according to these actions.

Figure 9:
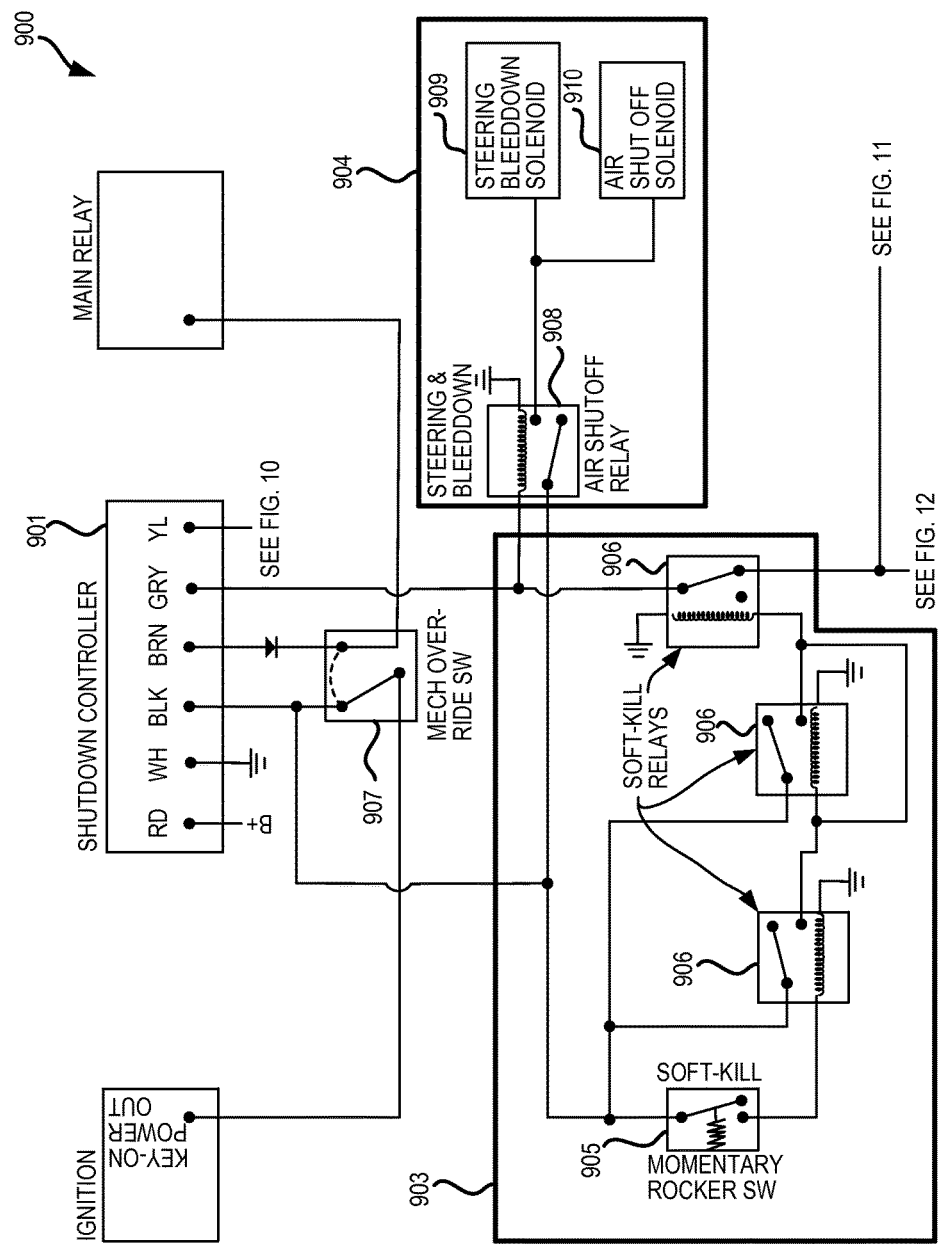
FIGS. 9-12 illustrate various aspects of an automated idle reduction system control circuit according to various embodiments.

Referring generally now to FIGS. 9-12, but with particular reference to FIG. 9, an IAS control circuit 900 may comprise but is not limited to a shutdown controller 901, a manual override switch 907, a soft kill control unit 903, and a steering/air control unit 904.

The shutdown controller 901 may comprise a system or device for evaluating defined conditions to assess idle and trigger the engine shutdown or other component actions. The shutdown controller 901 and various other aspects of IAS control circuit 900 may utilize relays. As discussed herein, relays may comprise any type of electrical component or circuit board suitable for sending or receiving an electrical signal from one point to another. For example, relays may comprise commercially-available automotive electrical relays now known in the art or which may become available. The relays may be coupled to certain switches, power sources, timers, sensors, components or electrical devices.

A shutdown controller 901 may send various signals, such as to soft kill control unit 903. In general, and with additional reference to FIGS. 1-3, a signal may be sent directing an APU 112, auxiliary air conditioner system 117, and auxiliary coolant interconnect system 119, OEM engine 115, OEM air conditioner system 116, or various other systems or aspects of systems to turn on or turn off. This signal passes through the soft kill control unit 903. In this manner, the soft kill control unit 903 may override certain signals, such as in response to a manual soft kill switch 905 being depressed by an operator. This, in turn may operate the soft kill relays 906 which cause a signal to be sent to the shutdown controller 901 indicating that an operator has pressed the manual soft kill switch 905, as well as interrupting other circuit paths, such as between the shutdown controller 901 and APU auto start controller 1101 (FIG. 11), OEM/AUX selection unit 1201 (FIG. 12), OEM/AUX air conditioner selection unit 1203 (FIG. 12), and/or steering/air control unit 904 (FIG. 9), whereby the shutdown controller 901 may be signaled to take various actions, whereby the APU auto start controller 1101 may be signaled to start/stop an APU 112, whereby the OEM/AUX selection unit 1201 may be signaled to provide various accessory systems with power from an auxiliary source or from an original equipment source, whereby the OEM/AUX air conditioner selection unit 1203 may be signaled to switch between redundant components of OEM and auxiliary air conditioner systems and/or whereby steering/air control unit 904 may prepare steering and air systems for orderly shutdown (such as maintaining air pressure for future restart or by bleeding down pressure). As may be appreciated, a manual override switch 907 may be disposed between the shutdown controller 901 and the soft kill control unit 903, whereby at any point, an operator may manually override the IAS control circuit 900 and direct the system to leave the OEM engine 115 running and other actions.

The soft kill control unit 903 may comprise a series of relays, such as soft kill relays 906 connect to the manual soft kill switch 905. The soft kill relays 906 operate in response to at least one of: the manual soft kill switch 905 being operated and a signal being transmitted from the shutdown controller 901. In this manner, the soft kill control unit 903 may operate in response to both manual input (via the manual soft kill switch 905) and automated input (via the shutdown controller 901).

The steering/air control unit 904 may comprise one or more air shutoff relay 908. Air shutoff relay 908 may trigger various other systems, such as a steering bleeddown solenoid 909 and an air shut off solenoid 910 in response to signals provided by at least one of the shutdown controller 901 and the soft kill control unit 903. In this manner, the steering and air systems may be prepared for orderly shutdown (such as maintaining air pressure for future restart or by bleeding down pressure).

Figure 10:
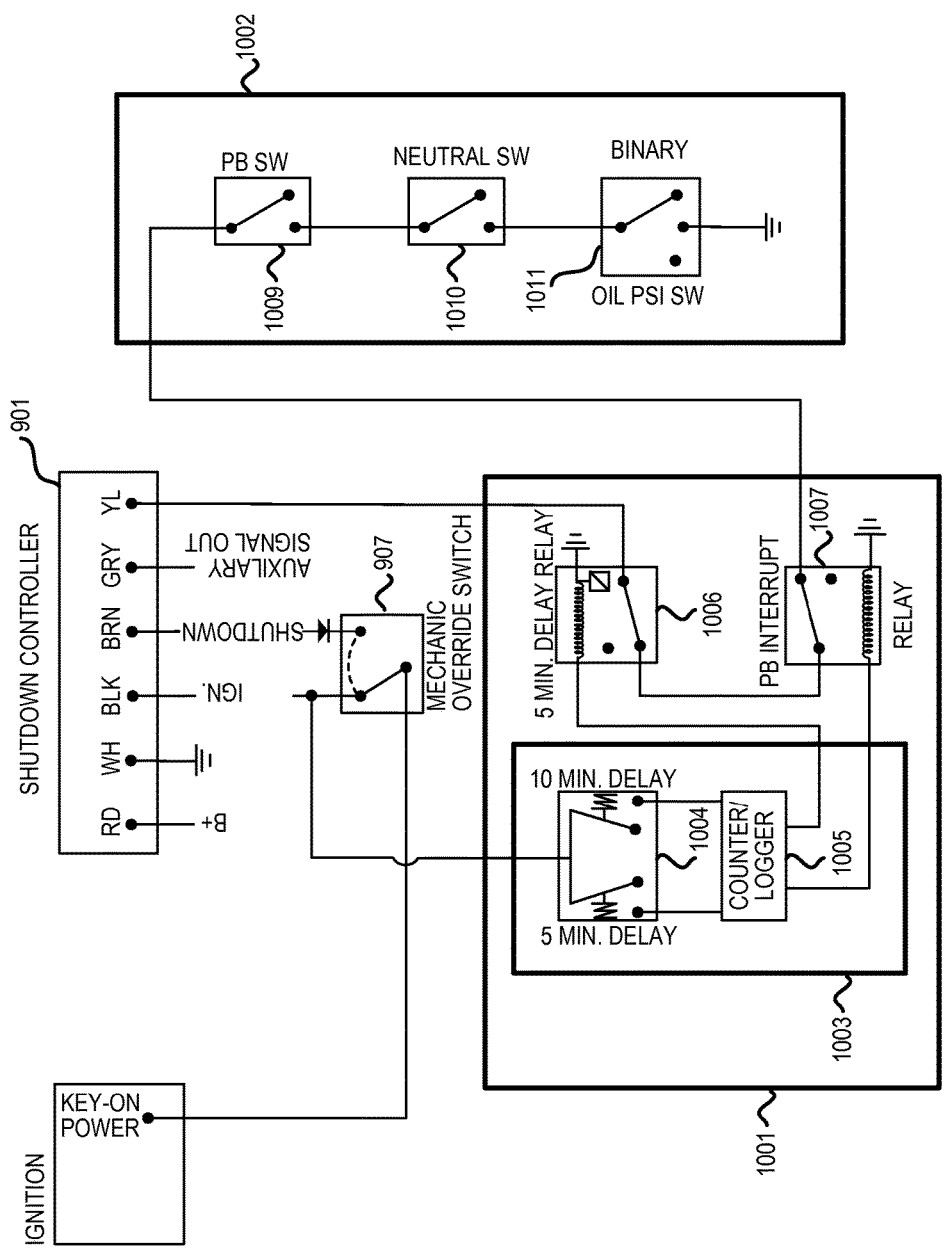

With reference now to FIGS. 9 and 10, an IAS control circuit 900 may further comprise a shutdown timer subsystem 1001. A shutdown timer subsystem 1001 may comprise a timer 1003, for instance a delay relay 1004 and a counter 1005, whereby the delay relay 1004 triggers the counter 1005 after a desired elapsed period of time, for instance, five minutes and/or ten minutes (e.g., "first short time period"). The counter 1005 may subsequently trigger another delay relay 1006 and/or a relay 1007 (e.g., "first long time period"), whereby the user/situational condition identification switches 1002 may be activated to assess a user/ situational condition after a desired period of time. In this manner, certain user/situational criteria may be assessed after an appropriate time delay during the shutdown and/or cold start processes.

An IAS control circuit 900 may further comprise user/situational condition identification switches 1002. User/situational condition identification switches 1002 may comprise one or more switch, toggled in response to various conditions of interest ("user/situational criteria"). For instance, the user/situational condition identification switches 1002 may comprise a parking brake state indication switch 1009, a gear box neutral indication switch 1010, and an oil pressure threshold switch 1011. The parking brake state indication switch 1009 may indicate whether the parking brake is set, and the gear box neutral indication switch 1010 may indicate whether the gear box is in neutral (for example, in preparation for engine shutdown or startup). Similarly, the oil pressure threshold switch 1011 may indicate whether the oil pressure is above or below a threshold (for example, to indicate whether an engine is running or is operating in a high idle state, or whether a Power Take Off is running, in preparation for engine shutdown or startup).

Figure 11:
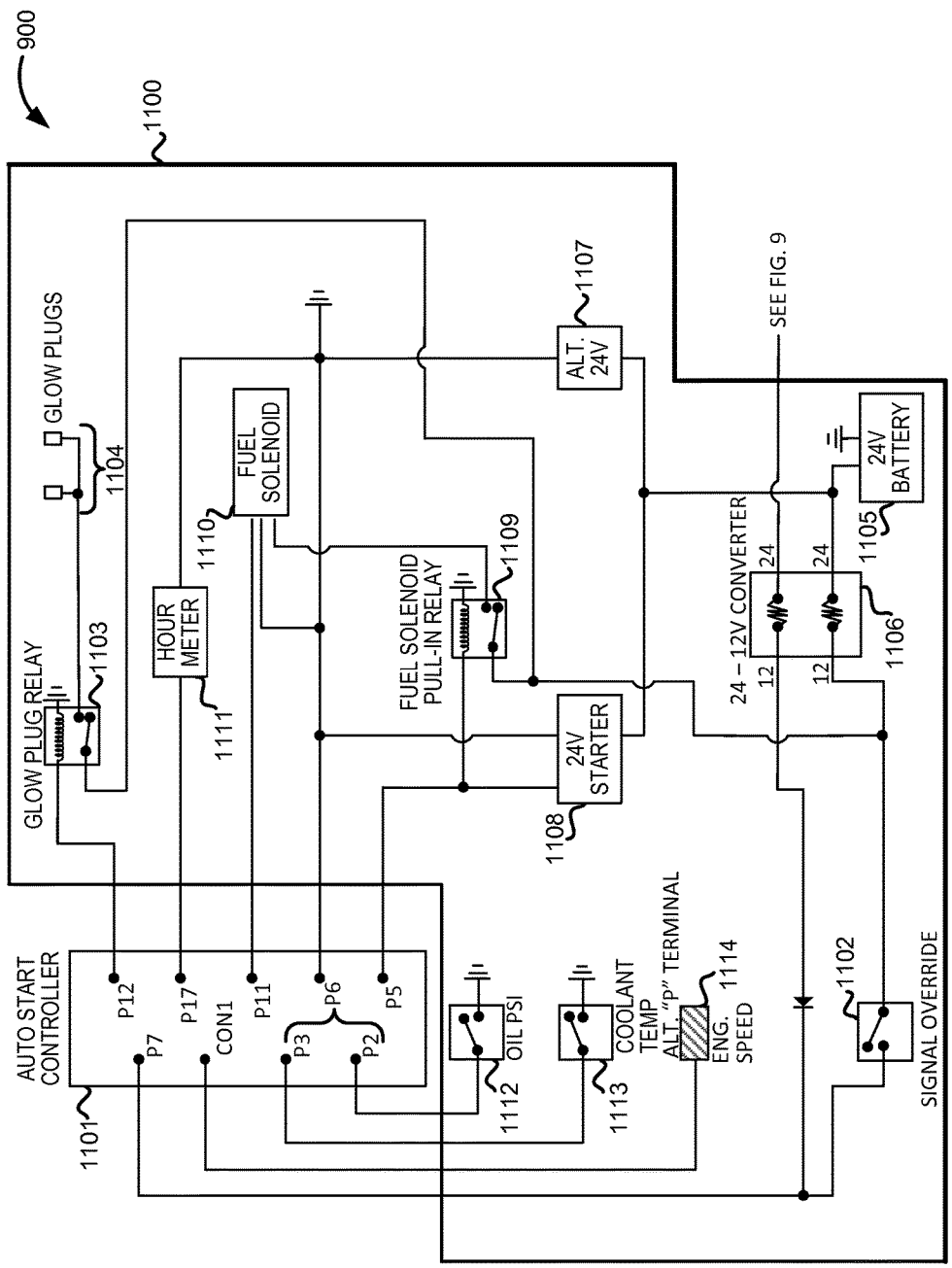

With reference now to FIGS. 9 and 11, an IAS control circuit 900 may further comprise an APU auto start controller 1101, and an APU control circuit 1100. APU control circuit 1100 may comprise various components connected to APU auto start controller 1101 and to soft kill control unit 903. In this manner, the APU control circuit 1100 may variously direct an APU 112 (FIGS. 1-3) to start up or shut down, in response to signals from a shutdown controller 901 passing through the soft kill control unit 903, as well as in response to APU auto start controller 1101. In brief, an APU auto start controller 1101 may comprise a system or device for evaluating defined conditions to trigger the APU 112 (FIGS. 1-3) startup or other component actions.

The APU control circuit 1100 may comprise various relays, switches and solenoids, among other components. The APU control circuit 1100 may comprise a signal override switch 1102. The signal override switch 1102 may comprise a manually operated switch whereby the APU auto start controller 1101 may be manually disabled from controlling the APU 112 (FIGS. 1-3) (such as by providing a "first cancel interrupt" or a "manual override"). In various embodiments, the APU control circuit 1100 comprises a glow plug relay 1103, selectively engagable by the APU auto start controller 1101 to power engine glow plug(s) 1104. The APU control circuit 1100 may comprise a battery 1105 and a power converter 1106 configured to convert the power from the battery 1105 to a desired voltage, such as from 24 volts to 12 volts. The APU control circuit 1100 may further comprise an alternator 1107 configured to charge the battery 1105 (e.g., "APU" and/or a component of APU 112 (FIG. 103) as discussed herein) and a starter 1108 configured to start up the APU 112 (FIGS. 1-3) in response to the APU auto start controller 1101. A fuel solenoid relay 1109 may selectively engage a fuel solenoid 1110 in response to an APU auto start controller 1101, such as to start and/or stop fuel flow to the APU 112 (FIGS. 1-3) via the fuel interconnect system 114 (FIGS. 1-3). Moreover, an hour meter 1111 may record the amount of time that the APU 112 (FIGS. 1-3) is running. Finally, various condition sensors, such as an oil pressure sensor 1112, coolant temperature sensor 1113, and optionally an engine speed sensor 1114 (e.g., an RPM sensor and/or an engine on/off sensor), may be connected to the APU auto start controller 1101 and may provide data in response to various conditions of interest ("user/situational criteria") so that the APU auto start controller 1101 may selectively start and stop the APU 112 (FIGS. 1-3) and/or take other actions or direct other signals in response to the various conditions of interest ("user/situational criteria").

Figure 12:
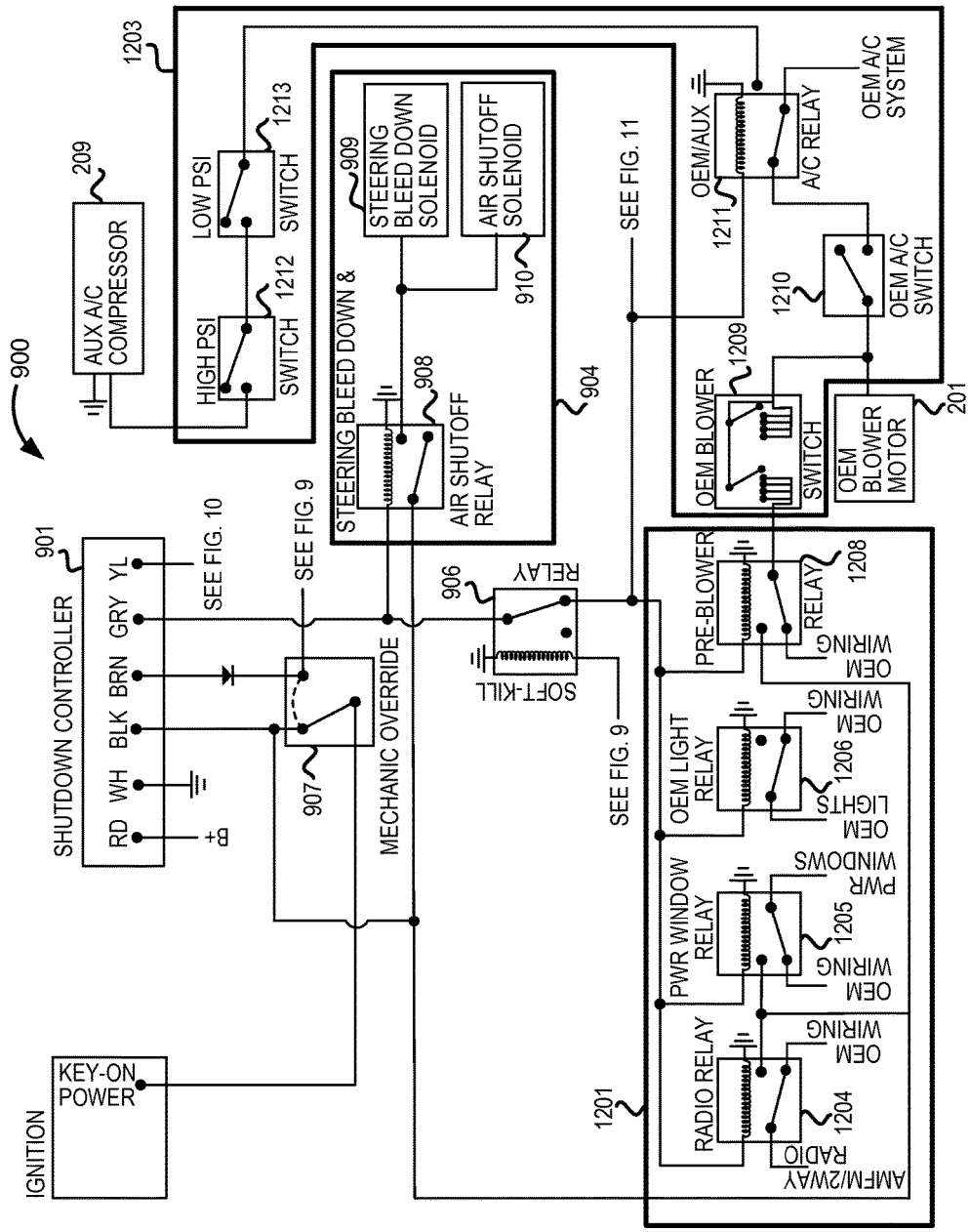

With reference to FIGS. 9 and 12, the IAS control circuit 900 may also comprise various auxiliary components. For instance, an auxiliary component may comprise any type of operating component, switch, valve, sensor, timer, radio, lights, safety equipment, regulator, or other device configured or configurable to operate in or on the equipment to be managed. Moreover, the shutdown controller 901 may be connected via the soft kill control unit 903 to OEM/AUX selection unit 1201 and OEM/AUX air conditioner selection unit 1203. The OEM/AUX selection unit 1201 may control the configuration of auxiliary components, such as radios, power windows, lights, and blowers/pre-blowers. The OEM/AUX air conditioner selection unit 1203 may control the configuration of various air conditioner components, such as auxiliary air conditioner system 117, auxiliary air conditioner interconnect system 113, and OEM air conditioner system 116.

The OEM/AUX selection unit 1201 may comprise relays. The relays may engage or select among OEM and auxiliary systems, such as redundant systems, in response to the shutdown controller 901. The OEM/AUX selection unit 1201 may comprise a radio relay 1204, a power window relay 1205, a light relay 1206, and a pre-blower relay 1208. These relays may select the power source for such components as radios, power windows, lights, and air conditioner blowers and/or may select which radios, power windows, lights, and air conditioner blowers to make operable.

The OEM/AUX air conditioner selection unit 1203 may comprise relays and/or switches. For example, an OEM blower switch 1209 may be connected to the pre-blower relay 1208 and may conduct power selectively to an OEM air conditioner condenser and electric fan 201 (FIGS. 1-3) in response to the switch being operated. An OEM air conditioner switch 1210 may selectively engage either an auxiliary air conditioner system 117 (FIGS. 1-3) or an OEM air conditioner system 116 (FIGS. 1-3) depending on various user/situation conditions and the instructions of the shutdown controller 901. Similarly, and OEM/AUX air conditioner relay 1211 may selectively connect various switches, such as the OEM air conditioner switch 1210 to either an auxiliary air conditioner system 117 (FIGS. 1-3) or an OEM air conditioner system 116 (FIGS. 1-3) depending on various user/situation conditions and the instructions of the shutdown controller 901, thus allowing the OEM air conditioner switch 1210 to control either system. In response to the OEM/AUX air conditioner relay 1211, the auxiliary air conditioner compressor 209 may be engaged. In various embodiments, a high PSI switch 1212 and a low PSI switch 1213 assess user/situation conditions such as whether the pressure of refrigerant in the auxiliary air conditioner compressor 209 (FIG. 2) falls within desired limits, and selectively permit or disallow the engagement of the auxiliary air conditioner compressor 209 (FIG. 2) in response.

With ongoing reference to FIGS. 9-12 and further reference to FIGS. 4-8, an example IAS control circuit 900 may automatically control the systems described herein according to various methods (See FIGS. 4-8).

Figure 4:
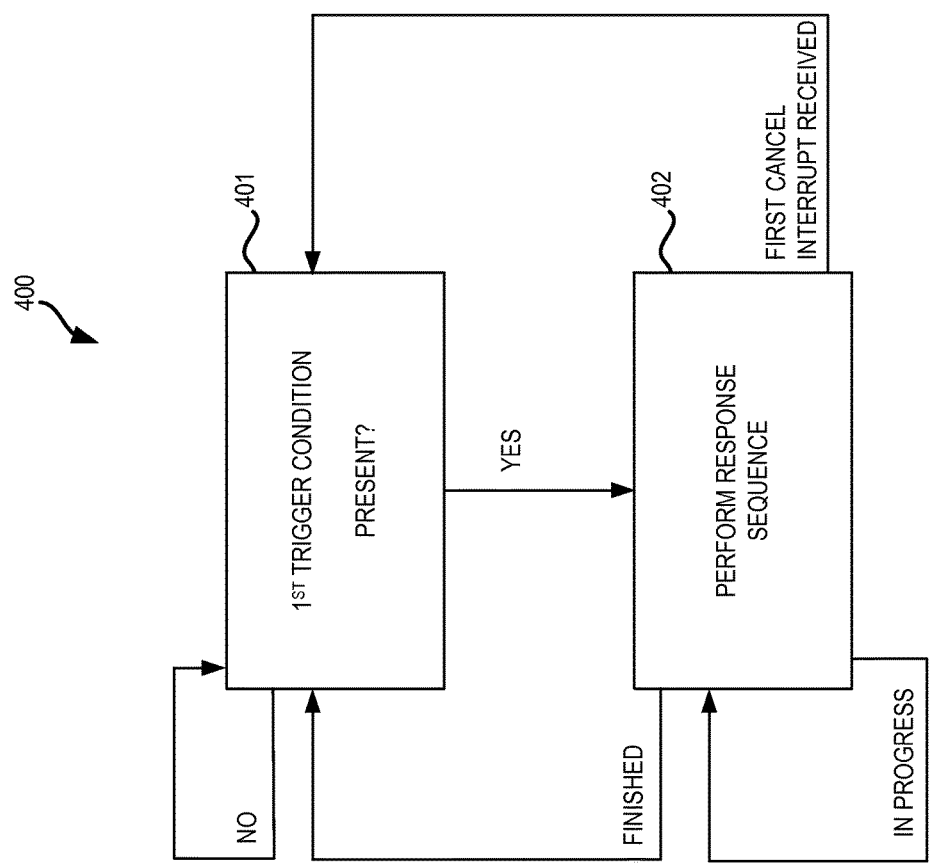
FIG. 4 illustrates a flow chart of an example trigger response operation of an exemplary automated idle reduction system according to various embodiments.
Figure 5:
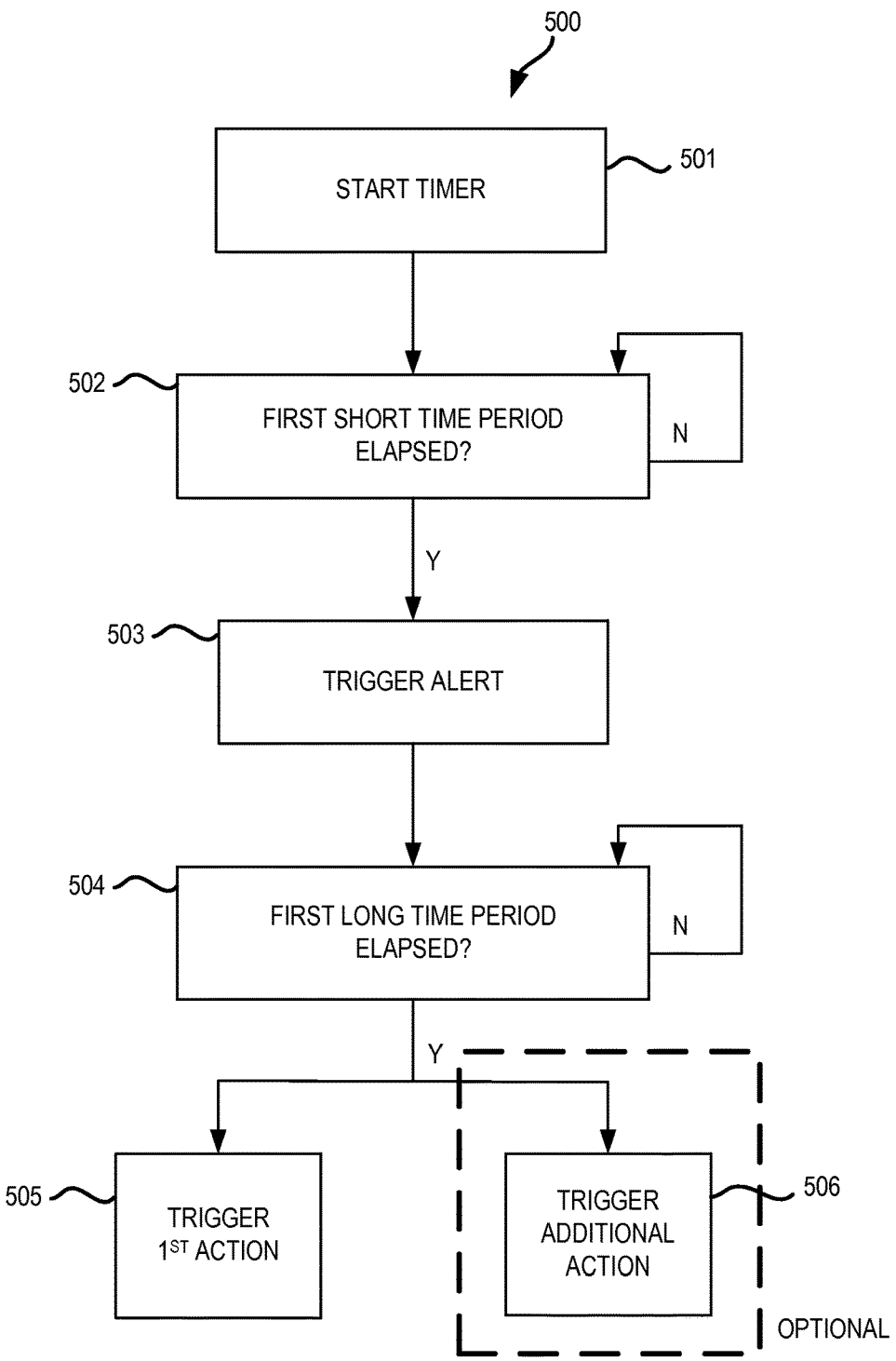
FIG. 5 illustrates a flow chart of an example timer action sequence of an exemplary automated idle reduction system according to various embodiments.
Figure 6:
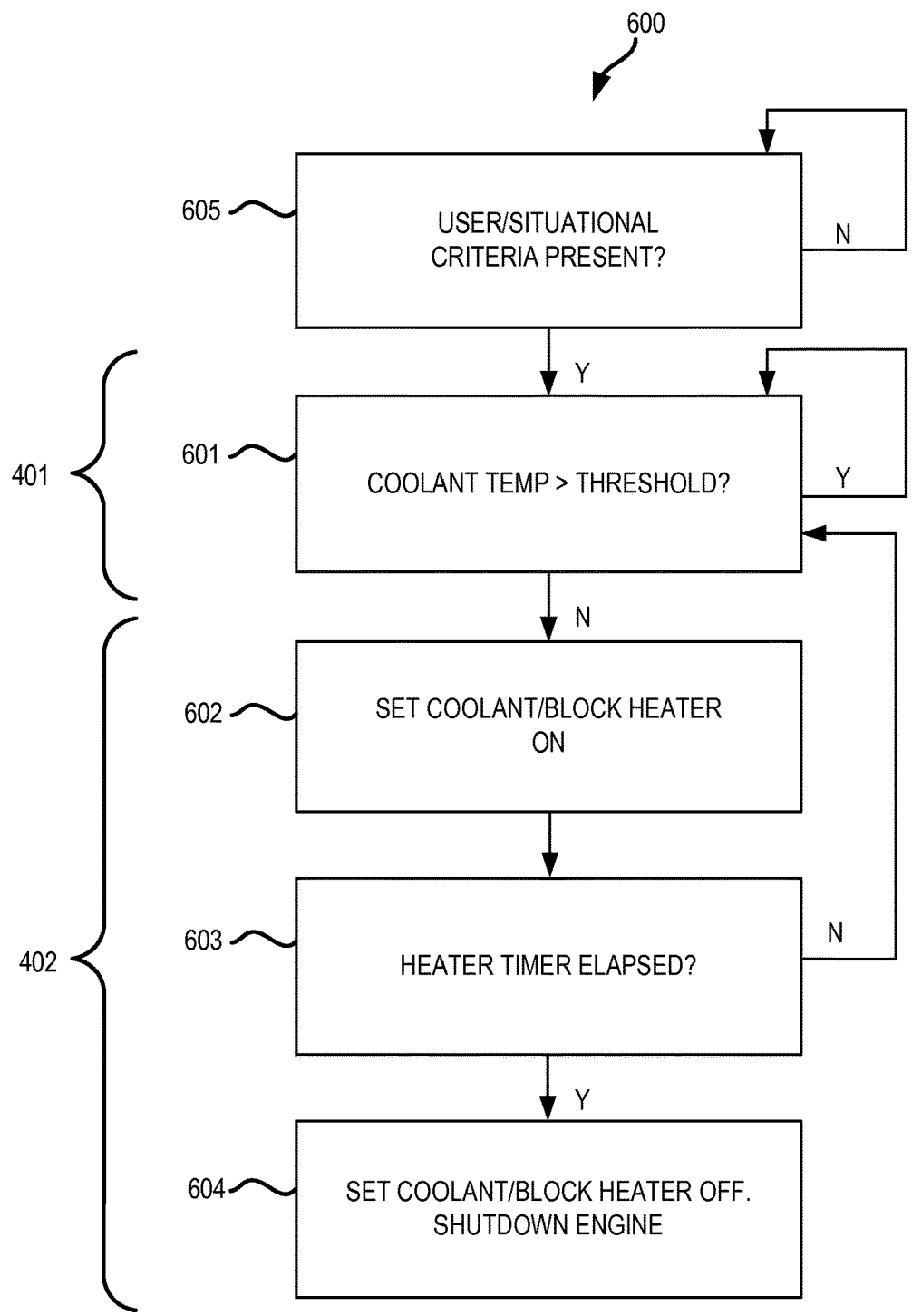
FIG. 6 illustrates a flow chart of an example heating system cycle of an exemplary automated idle reduction system according to various embodiments.

Directing attention to FIGS. 1 and 4, in accordance with an exemplary embodiment, one such method may include a trigger response operation 400. A trigger response operation 400 may include a first step of evaluating whether a first trigger condition is present (Step 401). In response to the first trigger condition being absent, the IAS 11 may continue to await the occurrence of a first trigger condition. In response to the first trigger condition being present, the IAS 11 may perform a response sequence (Step 402). In response to receiving a first cancel interrupt, the response sequence may be halted at any point and the trigger response operation 400 may return to step 401. In response to the response sequence being finished, the system may also return to step 401. However, in response to the response sequence being in progress, the system may await the completion of the first trigger response operation 400 before otherwise progressing.

With reference to FIGS. 1, 5, 9, 11, and 12, an example IAS control circuit 900 may further automatically control the systems according to a timer action sequence 500. A timer action sequence may begin with the starting of a timer (step 501). Upon the elapsing of a first short time period (Step 502), an alert may be triggered (step 503). Upon the elapsing of a first long time period (Step 504), a first action may be triggered (step 505). Optionally, additional actions may be triggered (step 506). For instance, an OEM/AUX selection unit 1201 may trigger a radio relay 1204, a power window relay 1205, and/or a light relay 1206 as "additional actions" such as to maintain these systems as operable and powered via a battery 1105 and/or starting an APU 112 via an APU auto start controller 1101, while a first action may include shutting down the OEM engine 115 by a shutdown controller 901.

Directing attention now to FIGS. 1, 3, 6, and 11, a heating system cycle 600 may comprise a specific implementation of trigger response operation 400. A heating system cycle 600 may include a first step, specifically evaluating whether user/situational criteria are present (Step 605). If at any point during the heating system cycle 600, the user/situational criteria become no longer present, the method 600 may be overridden, as desired. The heating system cycle 600 includes a first trigger condition 401 which may comprise whether a coolant temperature is greater than a threshold (Step 601), such as that evaluated by a thermostat assembly 303 having a coolant temperature sensor 1113. In response to the coolant being colder than the threshold, a response sequence 402 may be launched. For instance, a coolant/block heater may be activated (step 602). A heater timer may be started and may run until it elapses (Step 603). As the heater timer runs, the first trigger condition 401 may be reassessed; for instance, the coolant temperature may be compared to the threshold to determine whether the heater has elevated the coolant temperature sufficiently. In response to the heater timer elapsing, the coolant/block heater may be deactivated, and in various embodiments, an APU 112 (FIGS. 1-3) may be shut down (Step 604).

User/situational criteria during a heating system cycle 600 may include criteria such as the position of the cab climate control switches (e.g., fan switch), or an ambient temperature sensor, or a coolant temperature sensor 1113, or any switch, sensor, or logical indication. When the IAS 11 has gone into "Idle Shutdown Mode," relays will send signals to needed components such as a Coolant/Block Heater or water pump, which can be a standard component that may be on the equipment or added to the equipment, or can be included as part of the IAS. When the Coolant/Block Heater (which may comprise a heater, or the APU, or a combination thereof) is powered, the coolant temperature is monitored with a thermostat to signal whether the heater should be operating or not to keep the coolant at the desired temperature. The coolant may also be continuously or intermittently cycled using a Coolant Recirculating Pump. The coolant and the Coolant/Block Heater/Pump can also provide a source of heat for the cab climate control system. The Coolant/Block Heater/Pump may utilize whatever alternative power source has been established for that component (e.g. diesel or other fuel burner).

Figure 7:
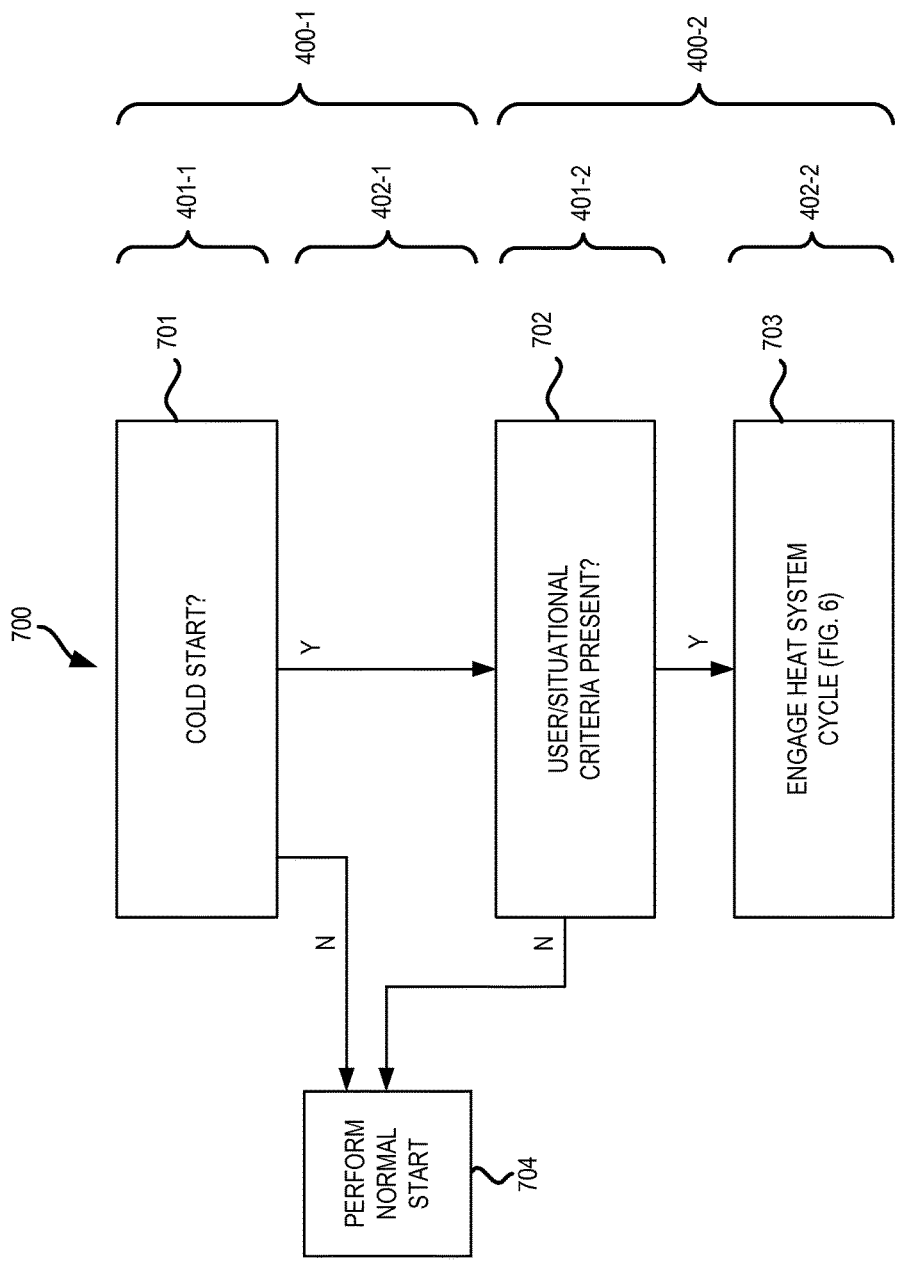
FIG. 7 illustrates a flow chart of an example engine start cycle of an exemplary automated idle reduction system according to various embodiments.

Now with reference to FIG. 7, an engine starting cycle 700 may also comprise a specific implementation of trigger response operation 400. An engine start cycle may comprise a first engine start trigger response operation 400-1, having a first trigger condition 401-1 comprising whether or not an engine is being started from a "cold start" (step 701). If the engine is not being started from a cold start, a first response sequence 402-1 may comprise performing a normal start (step 704). If the engine is being started from a cold start, a second engine start trigger response operation 400-2 may comprise determining whether a second trigger condition 401-2 exists, comprising whether a user/situational criteria is present (step 702). In response to the user/situational criteria not being present, a normal start is performed (step 704), but in response to the user/situational criteria being present, then a second response sequence 402-2 is initiated comprising engaging a heat system cycle, such as discussed with reference to FIG. 6 (step 703).

Figure 8:
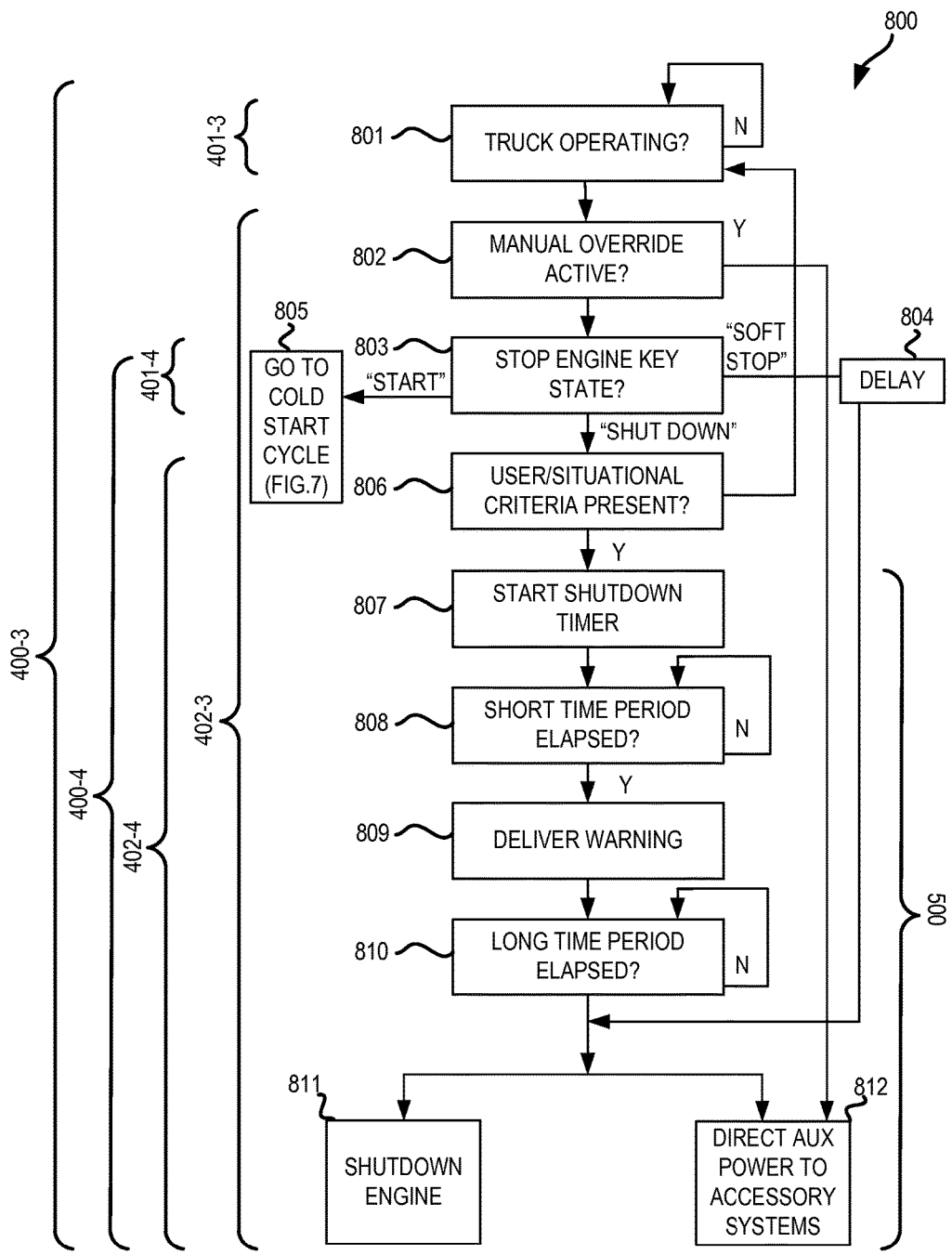
FIG. 8 illustrates a flow chart of an example engine shut down cycle of an exemplary automated idle reduction system according to various embodiments.

Turning to FIG. 8, an engine shut down cycle 800 may comprise one or more implementations of both trigger response operation 400, and a timer action sequence 500. A third trigger condition 401-3 may comprise whether a truck is operating (step 801). In response to the truck being operating, a third response sequence 402-3 may comprise numerous subsequent steps. For instance, a manual override (FIG. 9; 907) may be assessed (step 802). In response to the manual override being active, auxiliary power may be directed to accessory systems (such as by OEM/AUX selection unit 1201; FIG. 12) (step 812). In response to the manual override being inactive, a stop engine key state of a stop engine key may be assessed (step 803). In response to the key being in a "start position", a cold start cycle according to FIG. 7 may be initiated (step 805). In response to the key being in a "soft stop" position, a delay may be triggered (step 804), and the method may proceed directly to steps 811 and 812 discussed below (step 805). In response to the key being in a "shut down" position, a fourth trigger response operation 400-4 may be initiated. A fourth trigger condition 401-4 may be determined—specifically, whether user/situational criteria are present (step 806). In response to user/situational criteria being absent, the process returns to step 801. In response to the user/situational criteria being present, fourth response sequence 402-4 is started, the sequence comprising a timer action sequence 500. User/situational criteria may comprise conditions such as the equipment is placed in neutral (per gear box neutral indication switch 1010; FIG. 10) and the parking brake is engaged (per parking brake state indication switch 1009; FIG. 10) and a Power Take Off is in use (per oil pressure threshold switch 1011; FIG. 10). In response to the user/situational criteria being present, a timer may be started (see step 501), the timer comprising an idle shutdown timer (step 807). After a short time period has elapsed (see step 502) (step 808), a warning is delivered (see step 503) (step 809). In various embodiments, the short time period may comprise 4½ minutes, although any desired period may be implemented, for example, 5 minutes. The warning may comprise an audible warning and/or a visual alarm, such as in the cab to alert the operator that the engine will be shut down in the near future. At all points, the operator has the option to override the shutdown (step 802), such as in response to observing that the equipment will need to operate again shortly, or for another reason. Upon a manual override (step 802), the sequence will be restarted at step 801. Moreover, a change in user/situational criteria may similarly return the system to step 801 at any time in the process. For instance, the engine may be taken out of neutral, or the parking brake disengaged, or an oil pressure switch or other sensor may determine that a Power Take Off is in use, or the engine is operating in a "cold mode." After a long time period has elapsed (see step 504) (step 810), a first action is triggered (e.g., the IAS 11 causes the equipment to enter "Idle Shutdown Mode") (see step 505), the first action comprising shutting down an OEM engine (FIG. 1; 115) (step 811) (e.g., engaging an "Engine Kill Switch"). The long time period may comprise 5 minutes, or 10 minutes, or any period of time as desired. In various embodiments, optionally additional action is triggered (see step 506), the additional action comprising directing auxiliary power from a IAS 11 system to various vehicle systems (step 812) to abrogate the loss of power caused by the shutting down the OEM engine 115 (step 811) (e.g., engaging "Supplemental Power Mode").

Supplemental Power Mode may comprise various operations. For instance, with reference to FIG. 11, completion of the timer cycle which triggers the Idle Shutdown Mode and the Engine Kill Switch, may also send a signal to APU auto start controller 1101, and/or APU control circuit 1100, which then turns on an auxiliary power supply unit (APU) such as battery 1105, as well as to a variety of other switches and relays. Power from the APU is then available to, and switches or relays may turn on or off, various components, systems, processes, functions, and the like that may include, but are not limited to: Cab climate control fans, switches, and/or thermostats; Ambient temperature sensors; Coolant recirculating pump; Coolant temperature sensor; APU shut-off timer; Radios; Lights; Automatic windows; Air filtration systems; Hydraulic systems; Alarms; Compressor valves to prevent the loss of air pressure; Fuel valves; Switches; Relays; and so forth. Another component, such as a relay, also sends a signal to start an APU timer (e.g. 60 minutes) that will, at the end of its cycle, turn off all power to all components in a full shutdown of the equipment. For instance, referring to FIG. 4, a trigger condition 401 might comprise whether the APU timer has elapsed, and a subsequent response sequence 402 may comprise turning off all power to all components in a full shutdown of the equipment.

As mentioned, with reference to FIG. 8, in response to the key being in a "soft stop" position, a delay may be triggered (step 804), and a cold start cycle according to FIG. 7 may be initiated following the delay (step 805). In this manner, a switch in the cab may engage a delay, such as the timer comprising an idle shutdown timer, but the Idle Shutdown Mode is bypassed, directly enabling the operator to engage a "Soft Kill," which provides for an appropriate cool down period before the engine is shut down. At the end of the timer period, the Engine Kill Switch is engaged, which turns off the engine. Subsequently, the operator should turn the starter key to the off position (Step 803) and conduct any normal post-shutdown safety procedures. The equipment will then be ready for a normal cold start process (Step 805).

Various aspects of the Auxiliary Compressor Configuration may also be engaged based on the cab climate control settings and sensors and would receive power from the APU when the equipment is in Idle Shutdown Mode. The Auxiliary Compressor Configuration is plumbed into the on-board compressor and components using a series of valves, such as shuttle valve assembly 220 (FIG. 2) that would be turned on or off using a switch or sensors that receive a signal from a relay as a result of the IAS initiating Idle Shutdown Mode. Incorporating the Auxiliary Compressor Configuration in this manner enables the IAS to utilize the existing air conditioner components such as the evaporator, fans, ventilation ducts, cab switches, dryers, etc. Additionally, this Auxiliary Compressor Configuration can be wired to a switch that would allow it to operate as an alternative air conditioner system when the equipment is operating in normal mode in the event of a failure of the primary on-board compressor.

In addition to this Auxiliary Compressor Configuration switch, other externally mounted switches are included in this example. A switch may enable the IAS 11 to be turned on to pre-heat the coolant and engine block in a cold start scenario. Another switch may provide a complete shutdown and bypass of all IAS 11 systems and components, restoring all operating functions to their original operating condition. Additionally, the APU or auxiliary batteries may be tied into the equipment's existing "Battery Kill Switch" for safety, so that all power can be turned off from one source, as is standard with mining equipment.

Thus, as will be apparent to those skilled in the art, the IAS 11 offers a unique and cost effective system and method by which off-road equipment can be automatically turned off when defined idling conditions exist, triggering the automatic operation of alternative power supplies providing continued power to or operation of designated components, switches, valves, etc. The automated features of the IAS thereby eliminate normal impediments to turning off engines during intermittent idle situations that exist with most prior art systems. Additionally, because IAS can be customized to operational needs, there is greater likelihood that individual operators will successfully utilize the system in their normal work environment. The IAS can utilize readily available hardware and existing onboard components in conjunction with the automation of the system to allow for seamless equipment operation when going from an engine on to Idle Shutdown Mode rather than requiring operators to turn on or off a series of stand-alone components. This also enables the IAS to provide for greater consistency and reduced maintenance cost within a given fleet.

The foregoing disclosure is merely illustrative of the system(s) and method(s) and is not intended to be construed as limiting. Although one or more embodiments have been described, persons skilled in the art will readily appreciate that numerous modifications could be made without departing from the spirit and scope of the present disclosure. As such, it should be understood that all such modifications are intended to be included within the scope of the present disclosure. Thus, the scope of any patent claims that may issue based on this disclosure should not be limited to the above description, but instead should be determined only with reference to such patent claims along with their full scope of equivalents.

Various benefits and advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An integrated and automated idle reduction system for automatically controlling equipment powered by an original equipment manufacturer (OEM) internal combustion engine, the system comprising:
    an electrical circuit system that, in response to a predefined set of operating criteria being met, relays instructions to a shutdown controller, an OEM/AUX air conditioner (A/C) selection unit, and an auxiliary power unit (APU) auto start controller, the electrical circuit system comprising an idle timer in electrical communication with the shutdown controller and the APU auto start controller;
    a manual override switch in electrical communication with the shutdown controller;
    an engine kill switch connected to the OEM internal combustion engine and controllable in response to the shutdown controller of the electrical circuit system;
    an APU connected to and controllable in response to the APU auto start controller of the electrical circuit system, and the APU comprising at least one of a diesel engine and a gasoline engine;
    an OEM A/C compressor and an APU A/C compressor, wherein both the OEM A/C compressor and the APU A/C compressor are coupled to an auxiliary A/C interconnect system, and wherein the OEM/AUX A/C selection unit selectively couples one of the OEM A/C compressor and the APU A/C compressor, via the auxiliary A/C interconnect system, to an OEM A/C evaporator; and
    an auxiliary coolant interconnect system in fluid communication with the APU and the OEM internal combustion engine, wherein the auxiliary coolant interconnect system, via a thermostat, directs coolant to an OEM heater core and the OEM internal combustion engine.

2. The system according to claim 1, further comprising:
    at least one indicator for notifying the operator of the automated series of activities, the at least one indicator comprising at least one of an indicator light and a signal;
    wherein the at least one indicator is controlled by the electrical circuit system in response to at least one of the shutdown controller, the OEM/AUX selection unit, and the APU auto start controller.

3. The system of claim 1, further comprising a fuel interconnect system coupling the APU and the OEM engine such that the APU receives fuel from the OEM engine and returns unused fuel to the OEM engine.

4. The system of claim 1, wherein the A/C interconnect system comprises a shuttle valve assembly in fluidic connection with the OEM A/C evaporator, the APU A/C compressor, and the OEM engine A/C compressor.

5. A method of automatically shutting down an original equipment manufacturer (OEM) engine and starting an auxiliary power unit (APU), the method comprising:
    determining, by an idle alternative system (IAS) control circuit, that at least one user/situational criterion is present in the OEM engine;
    starting, by the shutdown controller of the IAS control circuit, a shutdown timer in response to the user/situational criterion being present;
    delivering, by the shutdown controller of the IAS control circuit, a warning in response to the shutdown timer indicating the passage of a first short time period;
    shutting down, by the shutdown controller of the IAS control circuit, the OEM engine in response to the shutdown timer indicating the passage of a first long time period; and
    engaging, by at least one of the shutdown controller and an APU auto start controller of the IAS control circuit, a Supplemental Power Mode, wherein the Supplemental Power Mode comprises turning on the APU and selectively coupling either of an OEM air conditioner (A/C) compressor or an auxiliary A/C compressor, via an auxiliary A/C interconnect system, to an OEM A/C evaporator,
    wherein the APU comprises at least one of a diesel engine and a gasoline engine.

6. The method according to claim 5, wherein the first short time period comprises 4½ minutes.

7. The method according to claim 5, wherein the first long time period comprises 5 minutes.

8. The method of claim 5, wherein the warning comprises an audible alert.

9. The method of claim 5, wherein the warning comprises a visual alert.

10. The method of claim 5, wherein the user/situational criteria comprises at least one of:
    determining that a power take off is not in use;
    determining that a parking brake is engaged; and
    determining that a gearbox is in neutral;
    wherein each determining step is performed by at least one of a user/situation condition identification switch and a condition sensor.

11. The method of claim 5, wherein the A/C interconnect system comprises a shuttle valve assembly in fluidic connection with the OEM A/C evaporator, the APU A/C compressor, and the OEM engine A/C compressor.

12. An integrated automated idle reduction system comprising:
- an idle alternative system (IAS) control circuit comprising:
- an idle shutdown timer;
- an auxiliary power unit (APU) control circuit whereby an APU is started by an APU auto start controller in response to an Idle Shutdown Mode, wherein the APU comprises one of a diesel engine and a gasoline engine;
- an original equipment manufacturer (OEM) battery and an OEM engine in electrical communication with the IAS control circuit, wherein the OEM engine is controllable in response to the shutdown controller and the OEM engine is stopped in response to the Idle Shutdown Mode and
- an OEM air conditioner (A/C) compressor and an APU A/C compressor, wherein both the OEM A/C compressor and the APU A/C compressor are coupled to an auxiliary A/C interconnect system, and wherein, in response to the Idle Shutdown Mode, an OEM/AUX air conditioner selection unit selectively couples either of the OEM A/C compressor or the APU A/C compressor, via the auxiliary A/C interconnect system, to an OEM A/C evaporator.

13. The system of claim 12, wherein the A/C interconnect system comprises a shuttle valve assembly in fluidic connection with the OEM A/C evaporator, the APU A/C compressor, and the OEM engine A/C compressor.

\* \* \* \* \*